United States Patent [19]

Knippenberg et al.

[11] 3,772,774

[45] Nov. 20, 1973

[54] METHOD OF MANUFACTURING MULTIPLE CONDUCTIVE LEAD-IN MEMBERS

[75] Inventors: Wilhelmus Franciscus Knippenberg; Gerrit Verspui, both of Emmasingel, Eindhoven, Netherlands

[73] Assignee: U.S. Philips Corporation, New York, N.Y.

[22] Filed: July 6, 1970

[21] Appl. No.: 56,142

Related U.S. Application Data

[63] Continuation of Ser. No. 722,862, April 22, 1968, abandoned.

[30] Foreign Application Priority Data

Apr. 26, 1967 Netherlands ........................ 6705847

[52] U.S. Cl. ........................ 29/624, 29/588, 29/589, 29/627, 29/629, 148/175, 174/68.5, 264/272, 317/101 R, 339/17 R

[51] Int. Cl. ........................ H01b 13/00, H01b 3/00

[58] Field of Search ...................... 29/589, 588, 629, 29/627, 624; 148/175; 339/17 R; 174/68.5; 317/101 R; 264/272

[56] References Cited

UNITED STATES PATENTS

| | | | |
|---|---|---|---|
| 3,346,414 | 10/1967 | Ellis et al. | 148/175 UX |
| 3,308,354 | 3/1967 | Tucker | 29/589 X |
| 3,383,760 | 5/1968 | Shwartzman | 29/589 X |
| 3,433,686 | 3/1969 | Marinace | 29/589 X |
| 3,384,955 | 5/1968 | Pierce | 29/627 X |

OTHER PUBLICATIONS

IBM Publication by Stern et al., Vol. 7, No. 11, April 1965, page 1103.

*Primary Examiner*—Charles W. Lanhan
*Assistant Examiner*—James R. Duzan
*Attorney*—Frank R. Trifari

[57] ABSTRACT

A method of manufacturing a multiple lead-in sturcture in which spaced deposits of a solvent for the constituents of the lead-in members are provided on a substrate which is then heated to liquify those deposits and form molten droplets. Thereafter, the substrate is exposed to a vapor atmosphere containing the lead-in member constituents which are dissolved in the molten droplets and epitaxially deposit from the droplets onto the surface of the substrate. The latter step is continued until elongated crystals of the lead-in member constituents grow on the sites of the solvent deposits. Thereafter, an insulating material is provided between the elongated crystals. The substrate is then removed and the ends of the crystals provided with metal layers which serve as electrical contacts.

9 Claims, 2 Drawing Figures

INVENTORS
WILHELMUS F. KNIPPENBERG
GERRIT VERSPUI
BY
Frank R. Trifari
AGENT

METHOD OF MANUFACTURING MULTIPLE CONDUCTIVE LEAD-IN MEMBERS

This invention is a streamlined continuation of Serial No. 722,862, now abandoned, filed April 22, 1968.

The invention relates to the manufacture of multiple conductive lead-in members.

The term "conductive lead-in members" is to be understood to mean insulating bodies which accommodate conductive elements extending through these bodies from one surface to an opposite surface. As is known, such bodies are used for establishing electrically conductuve connections through a wall.

For this purpose it is known to seal or sinter individual metal wires in an insulating material, such as glass. Such lead-in members are used, for example, in the manufacture of incandescent lamps and discharge tubes.

The known manufacture of lead-in members provides difficulty, however, when a large number of conductive elements have to be led through a small area and in addition have to be situated according to a predetermined pattern.

The present invention is based on the recognition that, as is known from "Transactions Metallurgical Society AIME" 233, 1965, 1053, various conducting substances, such as Si, SiC and GaP, can be grown with desired diameters and lengths at predetermined sites on the surface of a substrate substantially at right angles thereto by means of a VLS (Vapour-Liquid-Solid) mechanism and that a resulting assembly of conducting elements can readily be converted into a multiple conductive lead-in member by the provision of insulating material between the elements.

As is described in the said article, in VLS growth a substance to be crystallized or its constituents may be incorporated from a gas phase in molten droplets of a metal in which the said substance is soluble, which droplets are locally provided on a substrate, the substance being deposited on the substrate by way of the droplets.

The invention relates to a method of manufacturing multiple conductive lead-in members which is characterized in that conductive elements are grown on a substrate by means of a VLS mechanism, insulating material is provided between the elements, the substrate is removed and the conductive elements are contacted.

The provision of the insulating material may be effected with the aid of a solution or a melt of the insulating material, for example by pouring, immersion, suction or capillary forces, or by strewing a powdered insulating material between the elements and subsequent sintering or melting.

The external boundaries of the lead-in members may obviously be controlled by using a mould for the provision of the insulating material.

The substrate on which the assembly of conductive elements have been grown may be removed, for example, by etching or grinding.

Example 1.

Figure 1:
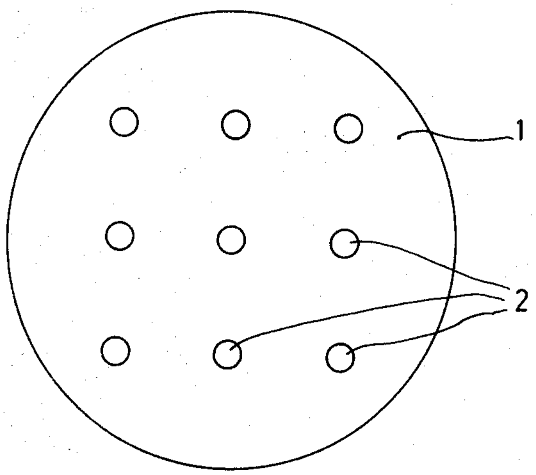

On a silicon wafer 1 shown in plan view to an enlarged scale in FIG. 1 gold dots 2 of diameter 10 microns and height 20 microns are vapour-deposited through a mask. The gold dots are arranged in a quadratic pattern with mutual spacings of 50 microns.

By heating at 950°C in a hydrogen atmosphere droplets of a An-Si alloy are formed. Subsequently 0.1 percent of $SiC1_4$ is added to the hydrogen at atmospheric pressure. From this gas atmosphere silicon is incorporated in the droplets and epitaxially deposited on the silicon crystal. Thus silicon whiskers 3 grow on the silicon crystal 1 according to the pattern of the gold dots 2 of FIG. 1, as is shown in section in FIG. 2. At the tip of each whisker there is a droplet 4 of gold-silicon.

A cylindrical mould 5 is then placed on the substrate so as to surround the whiskers and is filled with a resin 6, for example as epoxy resin, by pouring. The upper surface is ground to flatness and the silicon whiskers are provided with contacts at this side by electrodeposition of copper.

Finally the silicon substrate is removed by dissolving in HF-$HNO_3$, the exposed ends of the whiskers being also provided with copper contacts.

Example 2.

In a manner similar to that described in Example 1 with reference to FIG. 1, by deposition from vapour through a mask a plate-shaped silicon carbide crystal is provided with a circular pattern of iron dots of diameter 10 microns and thickness 50 microns with mutual spacings of 100 microns.

The assembly is treated at a temperature of 1,300°C in a flow of hydrogen containing 0.01 percent of methyl chlorosilane ($SiHC1_2CH_3$) and 0.001 percent of $A1C1_3$. During this process the iron melts and silicon, carbon and aluminum dissolve in the molten iron. As a result aluminum doped silicon carbide is epitaxially deposited on the substrate crystal from the iron droplets in the form of whiskers of good electrical conductivity arranged in the pattern of the dots of iron.

Figure 2:
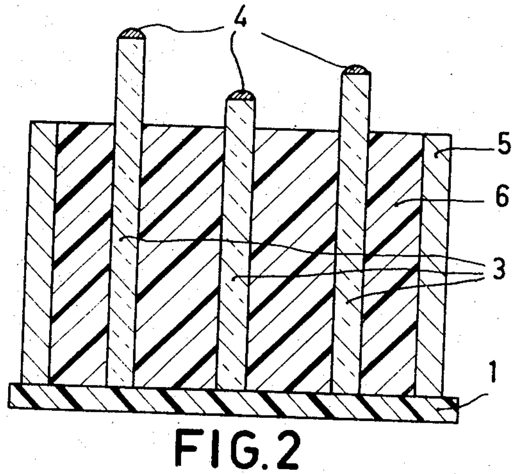

In a manner similar to that described in Example 1 with reference to FIG. 2, the whiskers on the substrate are surrounded by a cylindrical mould, which is filled with powdered hard glass which subsequently is melted. Then the substrate is removed and both faces are ground to flatness.

Finally the tips of the whiskers are plated with gold by electrodeposition and the contact resistance of the contacts is reduced by voltage breakdown.

What we claim is

1. A method of manufacturing an array of conductive lead-in members comprising the steps of depositing a metallic dot on discrete areas of a crystalline substrate to form a plurality of spaced metallic areas thereon, heating said substrate with said deposited metallic dots to a temperature at which said metal melts in an atmosphere containing the constituents of said lead-in members whereby the constituents of said atmosphere are dissolved in the molten metallic dots, epitaxially depositing from the molten metallic dots said constituents of said atmosphere on the crystalline substrate in the form of whiskers at the locations of the spaced metallic areas, placing an open ended mould on top of said substrate surrounding said whiskers, filling said mould with an insulating material, removing the substrate from the whiskers, grinding the ends of the whiskers smooth, and depositing a conductive metal contact at both ends of at least part of the whiskers.

2. A method as claimed in claim 1 in which the substrate is silicon, the metal is gold, and the atmosphere is hydrogen containing silicon tetrachloride.

3. A method as claimed in claim 1 in which the substrate is silicon carbide, the metal is iron, and the atmosphere is hydrogen containing methyl chlorosilane.

4. A method as claimed in claim 1 in which the insulating material is glass.

5. A method as claimed in claim 1 in which the insulating material is an epoxy resin.

6. A method as claimed in claim 2 in which the ends of the whiskers are coated with copper.

7. A method as claimed in claim 3 in which the ends of the whiskers are coated with gold.

8. A method of manufacturing an array of conductive lead-in members comprising the steps of depositing a metallic dot on discrete areas of a crystalline substrate to form a plurality of spaced metallic areas thereon, heating said substrate with said deposited metallic dots to a temperature at which said metal melts in an atmosphere containing the constituents of said lead-in members whereby the constituents of said atmosphere are dissolved in the molten metallic dots, epitaxially depositing from the molten metallic dots said constituents of said atmosphere on the crystalline substrate in the form of whiskers at the locations of the spaced metallic areas, filling the spaces between the whiskers with an insulating material, removing the substrate from the whiskers and insulating material, and depositing conductive material at both ends of at least part of the whiskers.

9. The method as claimed in claim 8 further comprising, before depositing conductive material, the additional step of grinding to flatness the surface of the insulating material opposite to the substrate.

* * * * *